US011481616B2

(12) United States Patent
Spryn et al.

(10) Patent No.: US 11,481,616 B2
(45) Date of Patent: Oct. 25, 2022

(54) FRAMEWORK FOR PROVIDING RECOMMENDATIONS FOR MIGRATION OF A DATABASE TO A CLOUD COMPUTING SYSTEM

(71) Applicant: Microsoft Technology Licensing, LLC, Redmond, WA (US)

(72) Inventors: Mitchell Gregory Spryn, Seattle, WA (US); Intaik Park, Bellevue, WA (US); Felipe Vieira Frujeri, Vancouver (CA); Vijay Govind Panjeti, Bothell, WA (US); Ashok Sai Madala, Redmond, WA (US); Ajay Kumar Karanam, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 680 days.

(21) Appl. No.: 16/198,642

(22) Filed: Nov. 21, 2018

(65) Prior Publication Data

US 2020/0005136 A1 Jan. 2, 2020

Related U.S. Application Data

(60) Provisional application No. 62/692,505, filed on Jun. 29, 2018.

(51) Int. Cl.
*G06N 3/08* (2006.01)
*G06N 20/00* (2019.01)

(52) U.S. Cl.
CPC ............. *G06N 3/08* (2013.01); *G06N 20/00* (2019.01)

(58) Field of Classification Search
None
See application file for complete search history.

(56) References Cited

U.S. PATENT DOCUMENTS

2015/0019197 A1* 1/2015 Higginson ............ G06F 16/214
703/22

OTHER PUBLICATIONS

Jasem Almotiri, Khaled Elleithy, and Abdelrahman Elleithy. Comparison of Autoencoder and Principal Component Analysis Followed by Neural Network for E-Learning Using Handwritten Recognition. 2017. IEEE. (Year: 2017).*

(Continued)

*Primary Examiner* — Kakali Chaki
*Assistant Examiner* — Michael H Hoang
(74) *Attorney, Agent, or Firm* — Ray Quinney & Nebeker P.C; James Bullough

(57) ABSTRACT

To obtain one or more recommendations for the migration of a database to a cloud computing system, information about performance of the database operating under a workload may be obtained. A first machine learning model (e.g., a neural network-based autoencoder) may be used to generate a compressed representation of characteristics of the database operating under the workload. The compressed representation may then be provided as input to a second machine learning model (e.g., a neural network-based classifier), which outputs a recommendation regarding a characteristic (e.g., size, configuration, level of service) of the cloud database to which the database should be migrated. This type of recommendation may be made prior to migration, thereby making it easier to properly estimate the cost of running the cloud database and plan the migration accordingly.

14 Claims, 14 Drawing Sheets

(56) References Cited

OTHER PUBLICATIONS

Daniel Hsu. Time Series Compression Based on Adaptive Piecewise Recurrent Autoencoder. 2017. Cornell University (Year: 2017).*

"Analytics", Retrieved from: https://en.wikipedia.org/w/index.php?title=Analytics&oldid=845899526, Jun. 14, 2018, 8 Pages.

Ju, et al., "A Deep Learning Method Combined Sparse Autoencoder with SVM", In Proceedings of International Conference on Cyber-Enabled Distributed Computing and Knowledge Discovery, Sep. 17, 2015, pp. 257-260.

Knor, Gregorz, "Gregorz Knor's answer to How do you use autoencoders for classification?", Retrieved from https://www.quora.com/How-do-you-use-autoencoders-for-classification/answer/Grzegorz-Knor, Oct. 31, 2017, 2 Pages.

"International Search Report and Written Opinion Issued in PCT Application No. PCT/US2019/038066", dated Sep. 18, 2019, 16 Pages.

Shiwani, et al., "Comparison between Unsupervised Feature Learning Methods Using an Auto-Encoder and Self-Organizing Map Algorithm for Sign Language Recognition", In International Journal of Advanced Research in Computer Science and Software Engineering, vol. 4, Issue 12, Dec. 1, 2014, pp. 535-540.

"Autoencoder", Retrieved from https://en.wikipedia.org/wiki/Autoencoder, Feb. 18, 2019, 6 Pages.

"Azure Database Migration Service", Retrieved from https://azure.microsoft.com/en-us/services/database-migration/, Retrieved on Feb. 22, 2019, 7 Pages.

"Azure SQL Database DTU Calculator", Retrieved from https://dtucalculator.azurewebsites.net/, Retrieved on: Feb. 22, 2019, 3 Pages.

"HammerDB", Retrieved form https://www.hammerdb.com/, Oct. 2018, 20 Pages.

"Microsoft Data Migration Assistant v4.2", Retrieved from https://www.microsoft.com/en-us/download/details.aspx?id=53595, 2019, 6 Pages.

"Office Action Issued in European Patent Application No. 19737946.4", dated Jul. 11, 2022, 11 Pages.

Pulgar, et al., "AEkNN: An AutoEncoder kNN-based classifier with built-in dimensionality reduction", In Repository of arxiv:1802.08465v1, Feb. 23, 2018, 35 Pages.

* cited by examiner

FRAMEWORK FOR PROVIDING RECOMMENDATIONS FOR MIGRATION OF A DATABASE TO A CLOUD COMPUTING SYSTEM

CROSS-REFERENCE TO RELATED APPLICATIONS

This application claims priority to U.S. Provisional Patent Application No. 62/692,505 filed Jun. 29, 2018, titled "FRAMEWORK FOR CLOUD DATABASE SIZING RECOMMENDATION." The foregoing patent application is hereby incorporated by reference in its entirety.

BACKGROUND

Cloud computing is the delivery of computing services (e.g., servers, storage, databases, networking, software, analytics) over the Internet. Broadly speaking, a cloud computing system includes two sections, a front end and a back end, that are in communication with one another via the Internet. The front end includes the interface that users encounter through a client device. The back end includes the resources that deliver cloud-computing services, including processors, memory, storage, and networking hardware.

A cloud database is a database that runs on a cloud computing system. Cloud databases differ from non-cloud databases (i.e., databases that do not run on a cloud computing system) in many ways, such as service level objectives, implementations, hardware configurations, and the environments in which the databases run.

Many enterprises maintain one or more non-cloud databases, which may run on an enterprise's own computing infrastructure. More and more enterprises are migrating their non-cloud databases to cloud computing systems. Databases may also be migrated from one cloud computing system to another. However, when migrating a database to a cloud computing system, it can be difficult to determine the characteristics of the cloud database that will provide the desired level of performance at a reasonable cost.

Consider, as just one example, the size of a cloud database. Cloud databases may be available in many different sizes under many different pricing models. Choosing an incorrect size can have unfortunate consequences. If the size of the cloud database is estimated too high, this results in money being wasted. On the other hand, if the size of the cloud database is estimated too low, then the cloud database can run into performance issues.

It can also be difficult to determine other characteristics of a cloud database. For example, different configurations may be available for a cloud database. The different configurations may use different types of disk drives, different amounts of network bandwidth, etc. As another example, different levels of service may be available for a cloud database. The different levels of service may be reflected in different service level agreements that may be available to choose from when setting up a cloud database.

The problem of determining characteristics of a cloud database that will provide the desired level of performance at a reasonable cost may be magnified when large enterprises attempt to migrate a large system that includes many databases to the cloud. It can be difficult for enterprises to determine the overall cost of running the entire database system in a cloud environment before actually migrating a large number of databases over multiple years. Although it may be possible to change the characteristics of a cloud database after migration, determining the proper characteristics for multiple databases prior to the actual migration is still an important task, particularly for large enterprises who need to plan and estimate costs for large scale migrations that may last multiple years.

SUMMARY

The present disclosure provides a framework for providing one or more recommendations regarding the migration of one or more databases to a cloud computing system. The framework involves the use of two different machine learning models. A first machine learning model may be configured to generate a compressed representation of characteristics of a database under a workload. A second machine learning model may be configured to provide at least one recommended characteristic (e.g., size, configuration, level of service) for a cloud database based on the compressed representation that is generated by the first machine learning model. In some embodiments, the first machine learning model may be a neural network-based autoencoder, and the second machine learning model may be a neural network-based classifier.

To obtain one or more recommendations for the migration of a particular database to a cloud computing system, various information may be obtained about the performance of the database operating under a workload. This information may include performance counter data that is generated when a workload is executed against the database, as well as metadata related to the database. The first machine learning model (e.g., the neural network-based autoencoder) may be used to generate a compressed representation of characteristics of the database operating under the workload. The compressed representation may then be provided as input to the second machine learning model (e.g., the neural network-based classifier), which outputs a recommendation regarding a characteristic (e.g., size, configuration, level of service) of the cloud database to which the database should be migrated. This type of recommendation may be made prior to migration, thereby making it easier to properly estimate the cost of running the cloud database and plan the migration accordingly.

Another aspect of the present disclosure is related to creating a similarity space for compressed representations generated by the first machine learning model. As will be explained in greater detail below, the similarity space is useful for training the second machine learning model to map a particular compressed representation to a particular characteristic of a cloud database. The similarity space includes compressed representations that are generated by the first machine learning model and that correspond to different databases operating under corresponding workloads.

To create the similarity space, a plurality of different workloads may be executed against a plurality of different databases. In this context, the term "workload" refers to a set of transactions that may be executed against a database, as well as the relative timing of those transactions. The term "database" may refer to a database engine, data, and a schema that defines how the data is organized. A workload may be executed against different instances of a database running on a plurality of different computer systems having different hardware configurations. Information (such as performance counter data and metadata) corresponding to the execution of the workload on the different hardware configurations may be collected. Subsets of this information may be selected and used in the next phase, which involves the first machine learning model. Different combinations of the subsets of the collected information may be used as the input layer values and the output layer values for the first machine learning model. This may be done for each of a plurality of databases, thereby generating a plurality of compressed representations for each of the databases. In other words, a plurality of sets of compressed representations may be generated for a plurality of different databases, at least some of which have known characteristics.

These sets of compressed representations may be used during a training phase in which the second machine learning model (e.g., the neural network-based classifier) is trained to map a particular compressed representation that is generated by the first machine learning model (e.g., the neural network-based autoencoder) to a particular characteristic of a cloud database. During the training phase, the second machine learning model may be executed multiple times. Each time the second machine learning model is executed, input layer values for the second machine learning model may be selected from hidden layer values within sets of compressed representations corresponding to databases with known characteristics. Once the training phase has completed and the second machine learning model has been adequately trained, then the second machine learning model may be used to provide recommendations for the migration of databases in the manner described above.

In some embodiments, different categories of cloud databases (e.g., standard, premium, business critical) may be available. Different instances of the second machine learning model may be developed for each of the available categories. Then, when a compressed representation is generated corresponding to a particular database that is being migrated to a cloud computing system, that compressed representation may be provided to each of the instances of the second machine learning model. This results in different recommendations being generated corresponding to the different categories of cloud databases that are available.

As noted above, creating a similarity space may involve executing workloads against a plurality of databases running on a plurality of different computer systems having different hardware configurations, thereby generating information corresponding to the different hardware configurations for each of the databases. As also noted above, subsets of this information may be selected and used in the next phase (involving the first machine learning model). Another aspect of the present disclosure relates to the way that these subsets are selected. In some embodiments, the information includes time series data. For example, the information may include a plurality of time series corresponding to different performance counters. In such embodiments, selecting a subset of the information may involve identifying certain percentile values (e.g., the 50th percentile value and the 99th percentile value) for the time series that are included in the information.

When the second machine learning model has been sufficiently trained and the second machine learning model is being used to provide a recommendation for migration of a particular database, a similar technique may be used for selecting a subset of the information that is obtained for the database. In other words, certain percentile values (e.g., the 50th percentile value and the 99th percentile value) may be identified for the time series that are included in the information that is obtained for the database.

DETAILED DESCRIPTION

Figure 1:
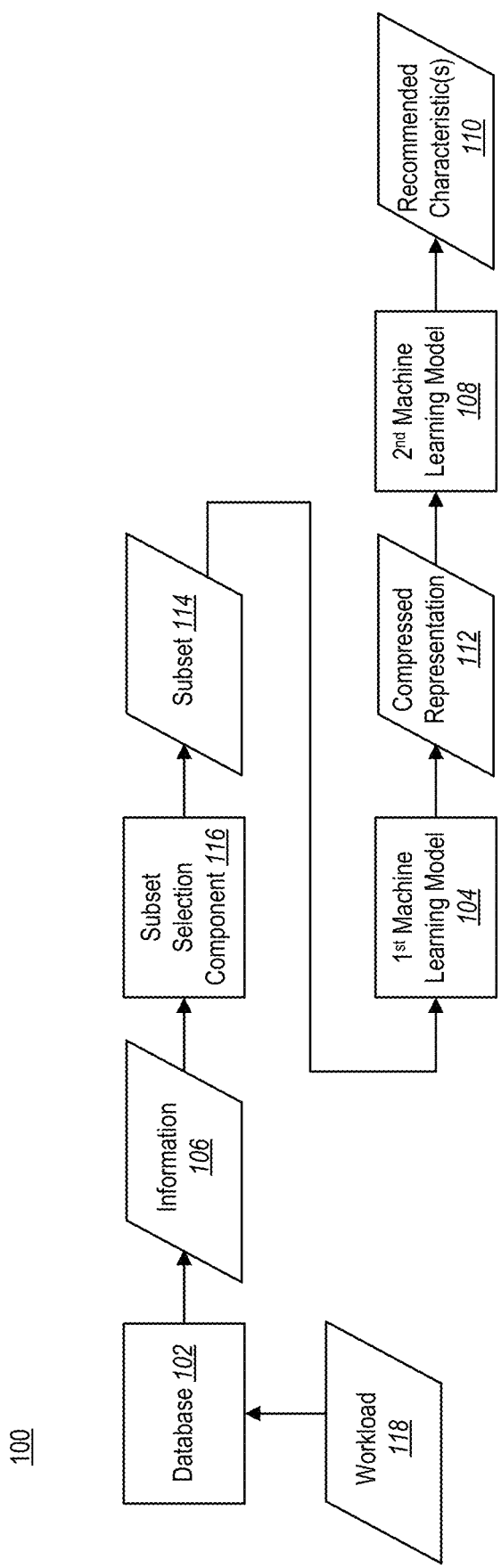
FIG. 1 illustrates a system for providing one or more recommendations for migration of a database to a cloud computing system in accordance with an embodiment of the present disclosure.

FIG. 1 illustrates a system 100 for providing one or more recommendations for migration of a database 102 (which may be a non-cloud database) to a cloud computing system in accordance with an embodiment of the present disclosure. The system 100 includes two different machine learning models. A first machine learning model 104 is configured to generate a compressed representation 112 of characteristics of the database 102 under a workload. A second machine learning model 108 is configured to provide at least one recommended characteristic 110 (e.g., size, configuration, level of service) for a cloud database based on the compressed representation 112 that is generated by the first machine learning model 104. In some embodiments, the first machine learning model 104 may be implemented as a neural network-based autoencoder, and the second machine learning model 108 may be implemented as a neural network-based classifier.

In order to provide one or more recommendations for the migration of the database 102 to a cloud computing system, certain information 106 may be obtained about the database 102 under a workload 118. The information 106 may include performance counter data and metadata about the database.

As used herein, the term "performance counter" (or simply "counter") may refer to instrumentation provided by a database that makes it possible to measure database performance. For example, performance counters may be telemetry events that are emitted by a server. There are many different types of information that may be provided by performance counters. Some examples include the number of requests per second that were issued by a particular module, how many messages were processed by a particular module, the average size of memory allocated to a set of modules, etc. Performance counters may provide information in the form of a time series. The term "metadata" refers to information about the hardware configuration and/or the software configuration of a database.

In addition to performance counter data and metadata about the database 102, other information 106 may be obtained as well. For example, the information 106 may include run-time data collected directly from the database 102. Dynamic Management Views (DMV) is one example of an interface that may be used to collect such run-time data.

Once the information 106 has been obtained, the first machine learning model 104 may be used to generate a compressed representation 112 of characteristics of the database 102 under the workload 118. In the depicted embodiment, the compressed representation 112 may be based on just a subset 114 of the information 106. In other words, the system 100 may be configured so that only a subset 114 of the information 106 (rather than all of the information 106) is selected and provided as input to the first machine learning model 104. A subset selection component 116 is shown in FIG. 1 for providing this functionality. Some examples showing how the subset 114 of the information 106 may be selected will be described below.

After the first machine learning model 104 has generated the compressed representation 112 of the characteristics of the database 102 under the workload 118, the compressed representation 112 may be provided as input to the second machine learning model 108. The second machine learning model 108 may output one or more recommendations regarding characteristics of the cloud database to which the database 102 should be migrated. For example, the second machine learning model 108 may output a recommended size for the cloud database, a recommended configuration for the cloud database, a recommended level of service for the cloud database, etc. FIG. 1 shows the second machine learning model 108 outputting one or more recommended characteristics 110.

The system 100 shown in FIG. 1 illustrates how the first machine learning model 104 and the second machine learning model 108 may be used to provide recommendations for migrating a particular database 102 to a cloud computing system. Before that can be done, however, the second machine learning model 108 should be trained to map a particular compressed representation 112 that is generated by the first machine learning model 104 to a particular characteristic of a cloud database. To facilitate that training, a similarity space may be created for compressed representations generated by the first machine learning model 104.

Figure 2:
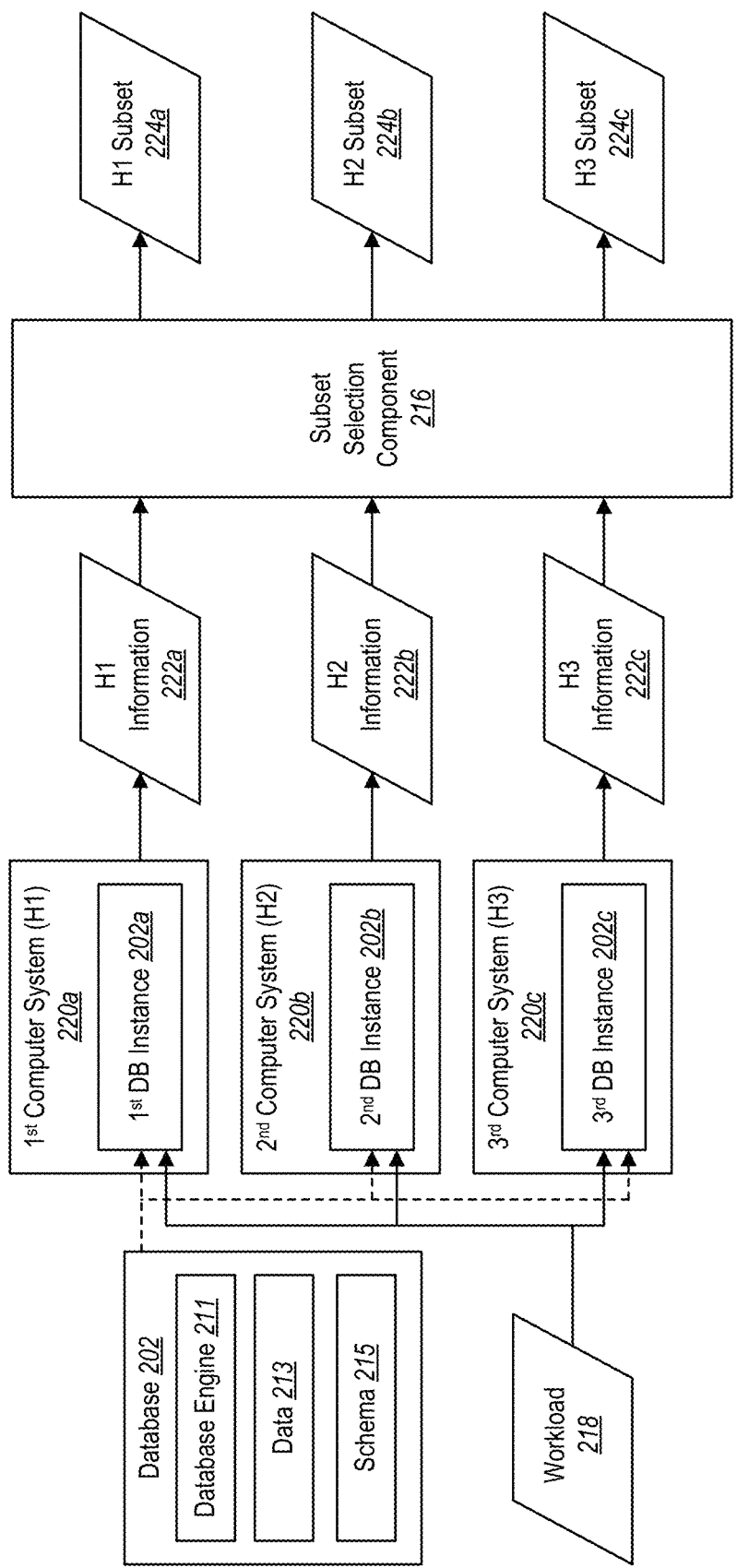
FIG. 2 illustrates how information about performance of a database operating under a workload may be generated by a plurality of different computer systems having different hardware configurations.

FIGS. 2-6 illustrate aspects of the present disclosure that are related to the creation of a similarity space. Reference is initially made to FIG. 2, which shows a workload 218 being executed against different instances 202a-c of a database 202 running on different computer systems 220a-c. In particular, the workload 218 is executed against a first instance 202a of the database 202 running on a first computer system 220a, a second instance 202b of the database 202 running on a second computer system 220b, and a third instance 202c of the database 202 running on a third computer system 220c. The number of computer systems 220a-c and database instances 202a-c shown in FIG. 2 is just an example; a different number of computer systems and database instances may be used instead.

The database 202 includes a database engine 211, data 213, and a schema 215 that defines how the data is organized. The different instances 202a-c of the database 202 may all have the same database engine 211, the same data 213, and the same schema 215. Thus, except for running on different computer systems 220a-c with different hardware configurations, the different instances 202a-c of the database 202 may otherwise be substantially identical.

The computer systems 220a-c may be cloud-based systems. As mentioned above, the computer systems 220a-c have different hardware configurations. In this context, the term "hardware configuration" refers to one or more characteristics of the computer system, such as virtual machine size, processor speed, processor type, number of processors, memory speed, memory type, amount of memory, type of hard drive, etc. The hardware configurations of the computer systems 220a-c may be referred to as H1, H2, and H3, respectively.

As a result of executing the workload 218 against the different instances 202a-c of the database 202 on the different computer systems 220a-c, three different sets of information 222a-c are produced. The information 222a-c includes performance counter data and metadata. Because of the different hardware configurations of the computer systems 220a-c, the various sets of information 222a-c are different from one another. The information 222a produced by executing the workload 218 against the first instance 202a of the database 202 on the first computer system 220a having hardware configuration H1 may be referred to as H1 information 222a. The information 222b produced by executing the workload 218 against the second instance 202b of the database 202 on the second computer system 220b having hardware configuration H2 may be referred to as H2 information 222b. The information 222c produced by executing the workload 218 against the third instance 202c of the database 202 on the third computer system 220c having hardware configuration H3 may be referred to as H3 information 222c.

Using all of the information 222a-c in connection with the creation of a similarity space may be undesirable, because the resulting similarity space may be difficult to interpret. Using all of the information 222a-c may also be quite computationally intensive. Therefore, subsets 224a-c of the information 222a-c may be used instead. A subset selection component 216 is shown in FIG. 2 for selecting the subsets 224a-c of the information 222a-c. Some examples showing how the subsets 224a-c of the information 222a-c may be selected will be described below.

FIG. 2 shows a single workload 218 being executed against different instances 202a-c of a database 202 that are running on a plurality of different computer systems 220a-c having different hardware configurations H1, H2, H3. Similar operations may be performed in connection with a plurality of different databases and different workloads. In other words, the operations that are shown in FIG. 2 in connection with the database 202 and the workload 218 may also be performed in connection with a plurality of other databases and workloads. Subsets of information similar to the subsets 224*a-c* shown in FIG. 2 may be generated for each of the databases and workloads.

Figure 3:
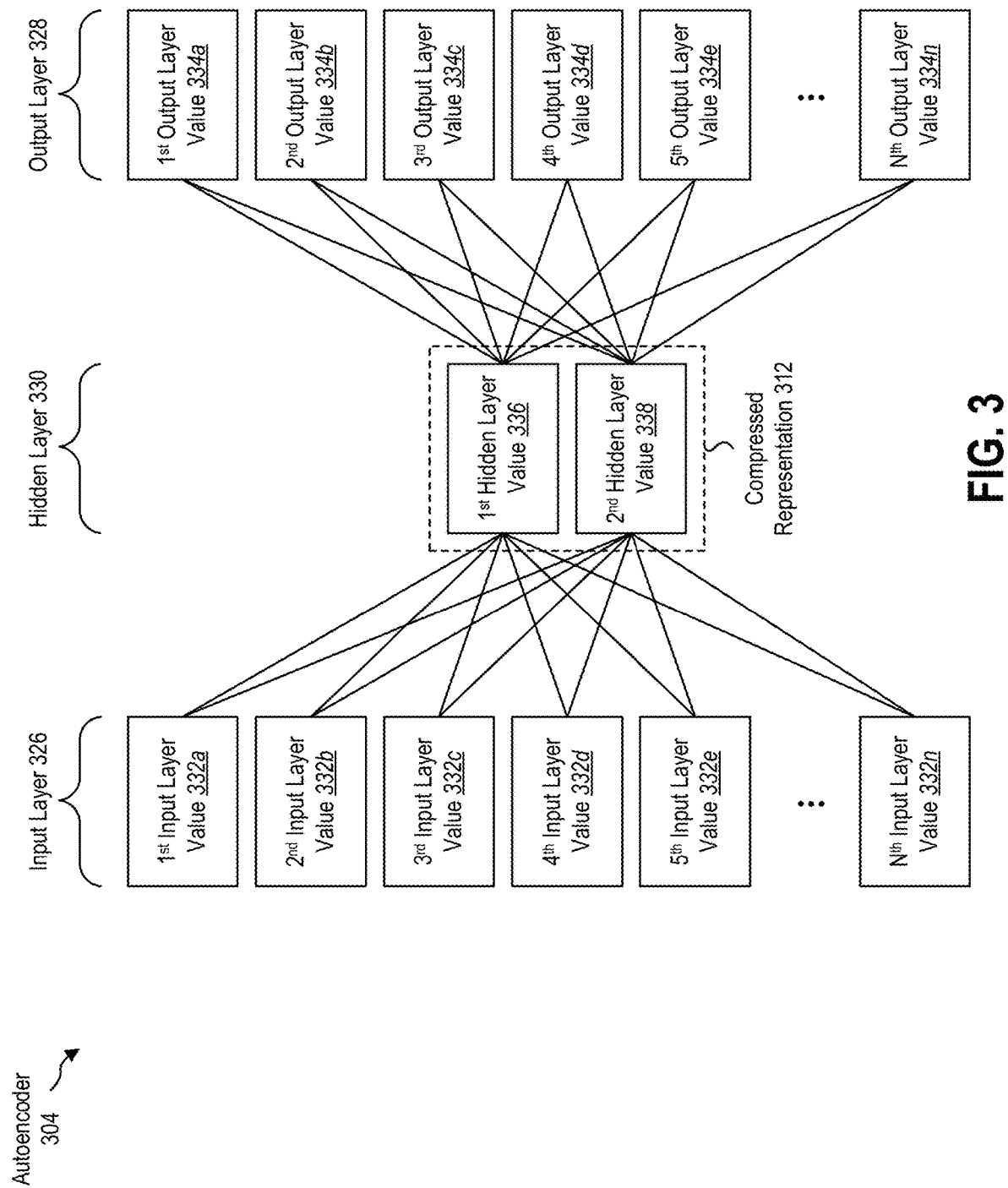
FIG. 3 illustrates an example of a neural network-based autoencoder, which represents one possible implementation of the first machine learning model in the system shown in FIG. 1.

FIG. 3 illustrates an example of a neural network-based autoencoder 304, which represents one possible implementation of the first machine learning model 104 in the system 100 shown in FIG. 1. An autoencoder 304 is a type of artificial neural network that includes an input layer 326, an output layer 328, and a hidden layer 330 connecting the input layer 326 and the output layer 328. The hidden layer 330 includes a compressed representation 312 of the input layer 326. The compressed representation 312 is sometimes referred to as a latent space representation.

An autoencoder 304 is typically used for dimensionality reduction. The input layer 326 and the output layer 328 of an autoencoder 304 typically have the same dimensions. In other words, the number of inputs is typically equal to the number of outputs. In FIG. 3, the input layer 326 is shown with N input layer values 332*a-n* and N output layer values 334*a-n*, where N is a positive, nonzero integer. However, the hidden layer 330 has fewer dimensions than the input layer 326 and the output layer 328. In other words, the hidden layer 330 includes fewer than N hidden layer values. In the depicted example, the compressed representation 312 in the hidden layer 330 includes two hidden layer values 336, 338. However, the number of hidden layer values shown in FIG. 3 is just an example; a different number of hidden layer values may be used instead.

The autoencoder 304 generates the compressed representation 312 of the input layer 326, including the hidden layer values 336, 338. The autoencoder 304 also reconstructs the output layer 328 from the compressed representation 312 of the input layer 326.

To generate sufficient data to enable the second machine learning model 108 to be adequately trained, the autoencoder 304 may be executed multiple times for each of a plurality of databases 202 and workloads 218. For each database 202 and workload 218, different combinations of the subsets 224*a-c* of the information 222*a-c* shown in FIG. 2 may be used as the input layer values 332*a-n* and the output layer values 334*a-n*. For example, in one iteration, the H1 subset 224*a* (i.e., the subset 224*a* of the information 222*a* that is generated by executing the workload 218 against the first instance 202*a* of the database 202 running on the first computer system 220*a* having hardware configuration H1) may supply both the input layer values 332*a-n* and the output layer values 334*a-n*. In another iteration, the H1 subset 224*a* may supply the input layer values 332*a-n* while the H2 subset 224*b* (i.e., the subset 224*b* of the information 222*b* that is generated by executing the workload 218 against the second instance 202*b* of the database 202 running on the second computer system 220*b* having hardware configuration H2) may supply the output layer values 334*a-n*. In another iteration, the H2 subset 224*b* may supply the input layer values 332*a-n* while the H3 subset 224*c* (i.e., the subset 224*c* of the information 222*c* that is generated by executing the workload 218 against the third instance 202*c* of the database 202 running on the third computer system 220*c* having hardware configuration H3) may supply the output layer values 334*a-n*.

In the example under consideration, in which three different hardware configurations (H1, H2, H3) are being used, nine different input/output combinations are possible. The different input/output combinations may be expressed as (H1, H1), (H1, H2), (H1, H3), (H2, H1), (H2, H2), (H2, H3), (H3, H1), (H3, H2), (H3, H3). These combinations are expressed in the form (input, output). For example, (H3, H2) represents an iteration of the autoencoder 304 in which the H3 subset 224*c* supplies the input layer values 332*a-n* while the H2 subset 224*b* supplies the output layer values 334*a-n*.

Each time the autoencoder 304 is executed, it produces a compressed representation 312 including hidden layer values 336, 338. Thus, for a given database 202 and workload 218, a compressed representation 312 including hidden layer values 336, 338 would be produced for the (H1, H1) combination, another compressed representation 312 including hidden layer values 336, 338 would be produced for the (H1, H2) combination, and so on. In the present example, nine different compressed representations 312 (including hidden layer values 336, 338) would be produced for each database 202 and workload 218, one compressed representation 312 for each of the aforementioned input/output combinations.

Figure 4:
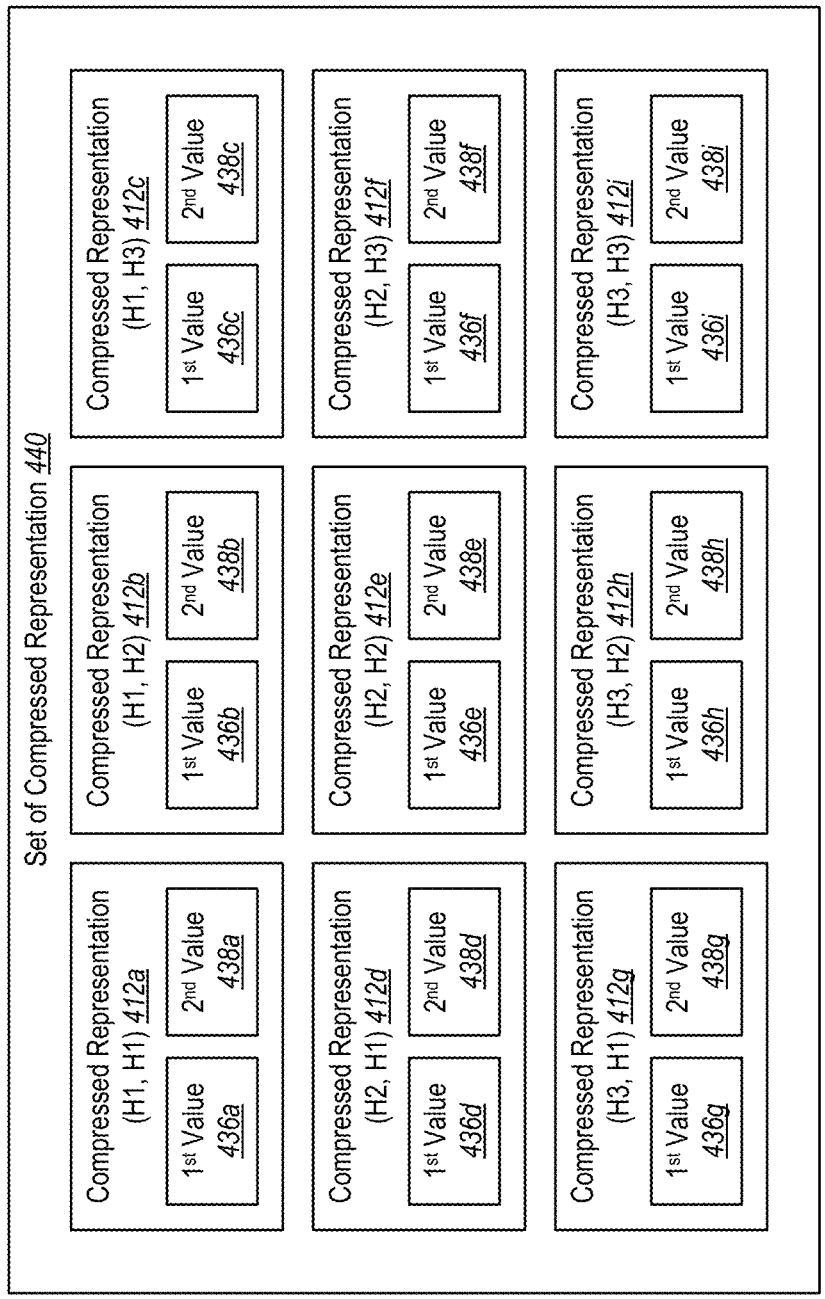
FIG. 4 illustrates an example showing different compressed representations that may be generated for a single database when a workload is executed against different instances of the database running on a plurality of different computer systems having different hardware configurations.

FIG. 4 shows the nine different compressed representations 412*a-i* (including hidden layer values 436*a-i*, 438*a-i*) that would be generated for a single database 202 and workload 218 in the present example, which utilizes three different hardware configurations. The compressed representation 412*a* for the (H1, H1) combination includes hidden layer values 436*a*, 438*a*. The compressed representation 412*b* for the (H1, H2) combination includes hidden layer values 436*b*, 438*b*. The compressed representation 412*c* for the (H1, H3) combination includes hidden layer values 436*c*, 438*c*. The compressed representation 412*d* for the (H2, H1) combination includes hidden layer values 436*d*, 438*d*. The compressed representation 412*e* for the (H2, H2) combination includes hidden layer values 436*e*, 438*e*. The compressed representation 412*f* for the (H2, H3) combination includes hidden layer values 436*f*, 438*f*. The compressed representation 412*g* for the (H3, H1) combination includes hidden layer values 436*g*, 438*g*. The compressed representation 412*h* for the (H3, H2) combination includes hidden layer values 436*h*, 438*h*. The compressed representation 412*i* for the (H3, H3) combination includes hidden layer values 436*i*, 438*i*.

In a conventional autoencoder, the input layer and the output layer are substantially identical. In other words, the autoencoder tries to reconstruct an output layer that substantially matches the input layer from the compressed representation of the input layer. In accordance with the techniques disclosed herein, however, the input layer 326 and the output layer 328 of the autoencoder 304 may sometimes be different. As discussed above, sometimes the input layer values 332*a-n* and the output layer values 334*a-n* may be taken from subsets of information that are generated using different hardware configurations, such as (H1, H2), (H1, H3), (H2, H1), (H2, H3), (H3, H1), (H3, H2). This may provide certain technical benefits by making the autoencoder 304 less dependent on any particular hardware configuration.

The compressed representations 412*a-i* shown in FIG. 4 are generated for a single database 202 and workload 218. The compressed representations 412*a-i* may be referred to collectively as a set 440 of compressed representations 412*a-i*. As noted previously, the autoencoder 304 may be executed multiple times for each of a plurality of databases 202 and workloads 218. A different set 440 of compressed representations 412*a-i* may be generated for each database 202 and workload 218.

Figure 5:
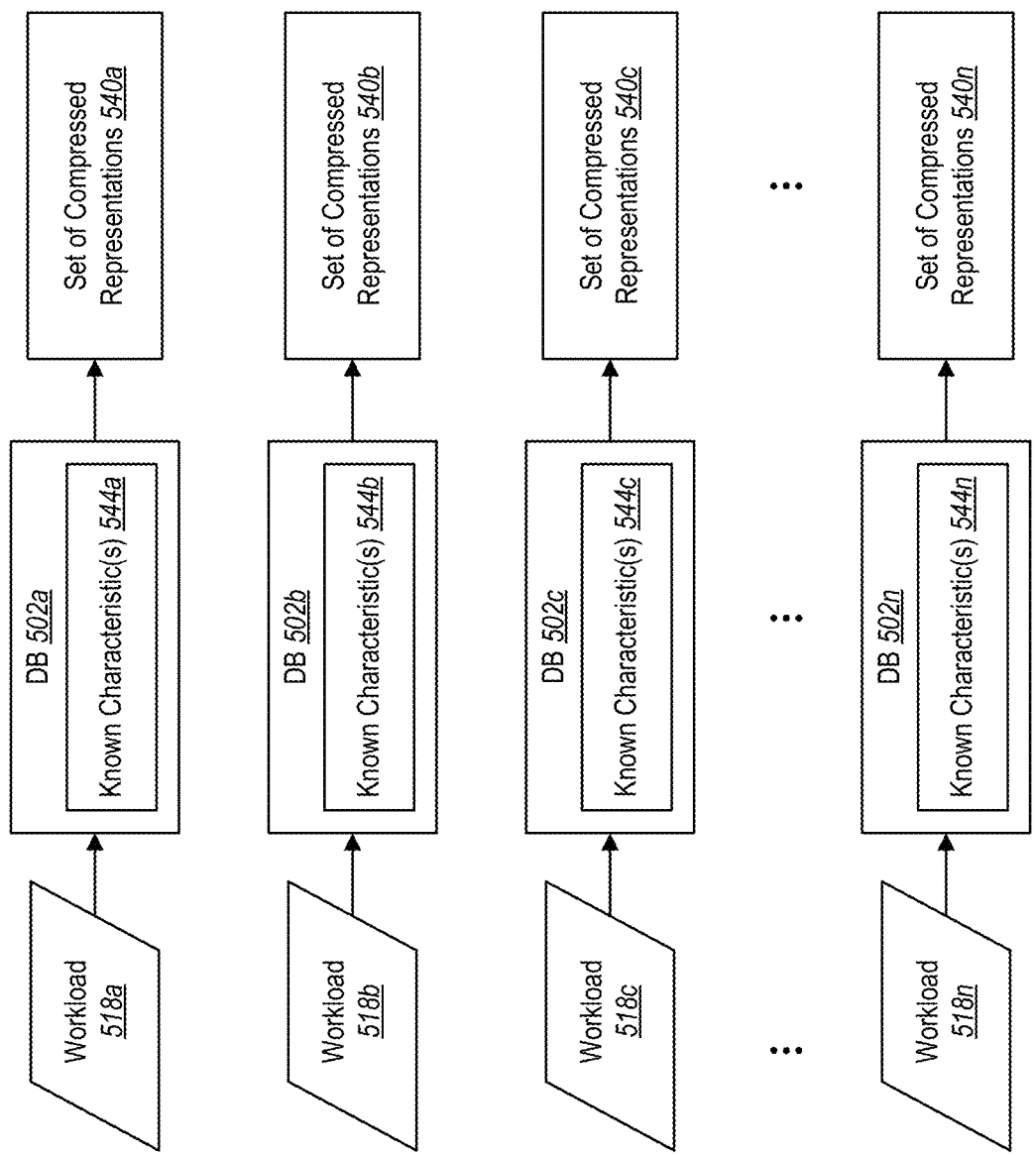
FIG. 5 illustrates a plurality of sets of compressed representations generated for a plurality of different databases when workloads are executed against the databases.

FIG. 5 illustrates a plurality of sets 540*a-n* of compressed representations generated via execution of a plurality of different workloads 518*a-n* against a plurality of different databases 502*a-n*. Although not shown in FIG. 5, the workloads 518*a-n* may be executed against different instances of the databases 502*a-n* on different computer systems having different hardware configurations, as described above in connection with FIG. 2. Each of the sets 540a-n of compressed representations may include hidden layer values like the hidden layer values 436a-i, 438a-i shown in FIG. 4. The various databases 502a-n may include one or more known characteristics 544a-n. In other words, something may be known about one or more relevant characteristics of some or all of the databases 502a-n. This may be useful for training the second machine learning model 108, as will be discussed in greater detail below.

Figure 6:
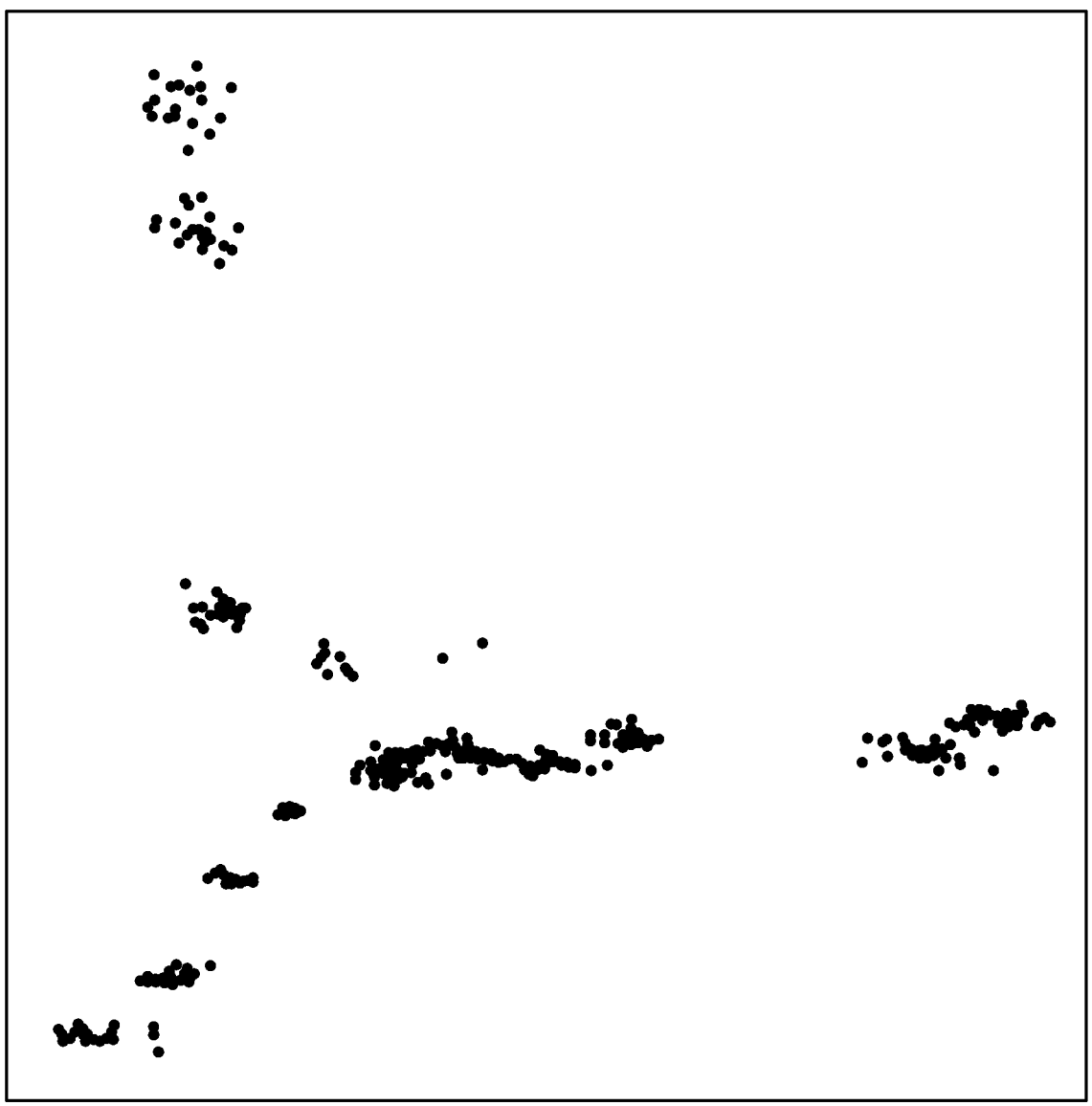
FIG. 6 illustrates a graph of a similarity space that includes different sets of compressed representations corresponding to different databases.

FIG. 6 illustrates a graph of a similarity space 642 that includes different sets of compressed representations corresponding to different databases 202. Each of the sets of compressed representations is shown as a plurality of dots. Each dot corresponds to a particular set of hidden layer values 336, 338 generated by the autoencoder 304. More specifically, each dot is a point on the graph having (i) an x-coordinate that corresponds to the first hidden layer value 336, and (ii) a y-coordinate that corresponds to the second hidden layer value 338.

The dots corresponding to a particular set of compressed representations are clustered together. However, the different sets of compressed representations are separated from one another in different locations on the graph. This suggests that the different databases 202 that are represented in FIG. 6 have different characteristics. This is also useful for training the second machine learning model 108, as will be discussed in greater detail below.

Figure 6A:
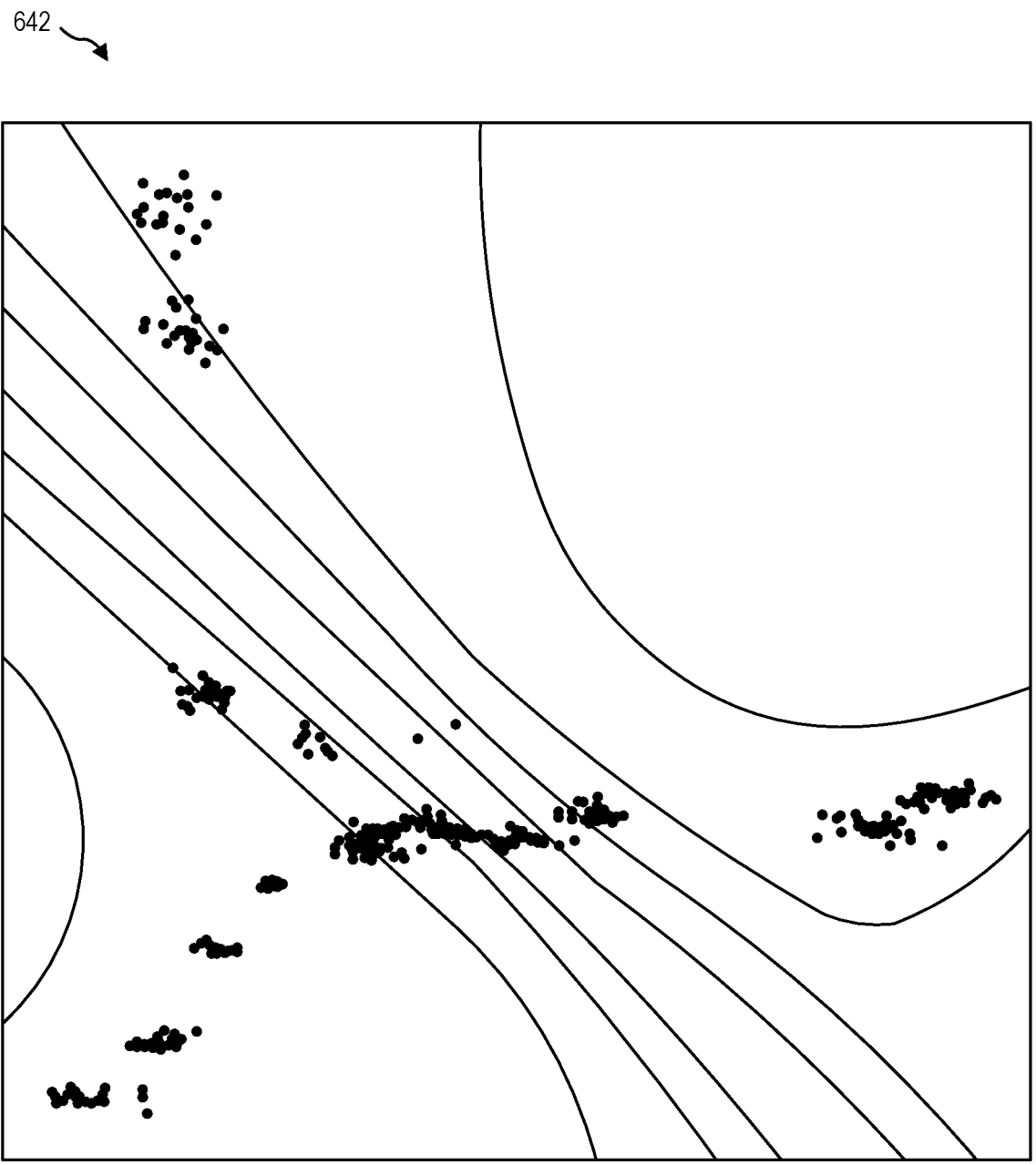
FIG. 6A illustrates the graph of the similarity space with different boundaries shown corresponding to different cloud database characteristics.

FIG. 6A illustrates the graph of the similarity space 642 with different boundaries shown corresponding to different cloud database sizes. As noted previously, the different sets of compressed representations in the similarity space 642 correspond to different databases 202. The databases 202 may have known characteristics. That information may be used to draw the boundaries shown in FIG. 6A. Each shaded region corresponds to a particular characteristic.

Figure 7:
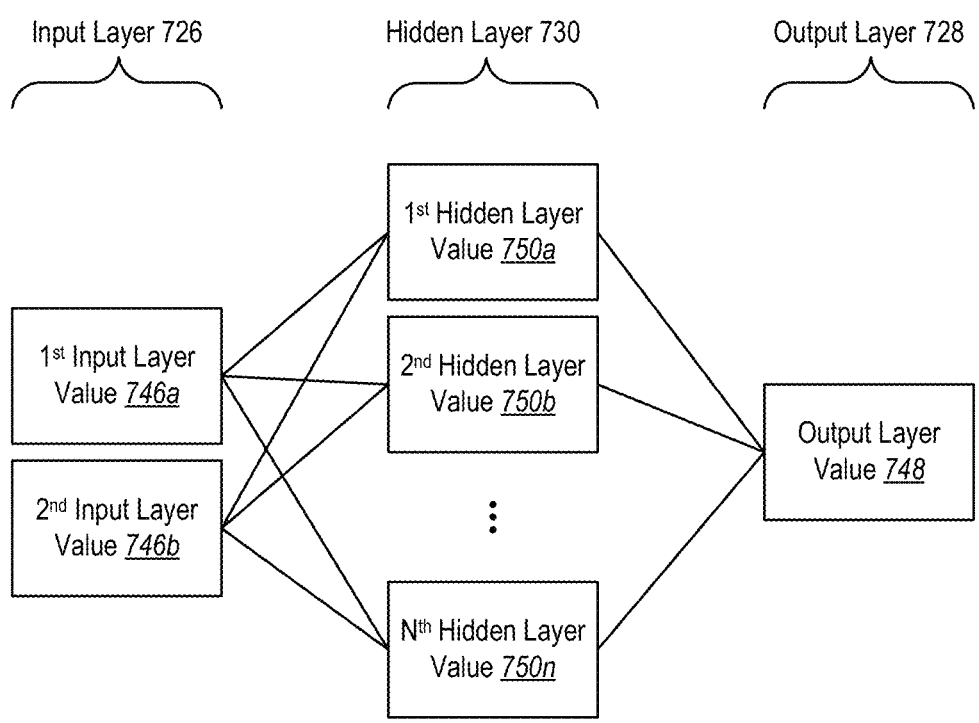
FIG. 7 illustrates an example of a neural network-based classifier, which represents one possible implementation of the second machine learning model in the system shown in FIG. 1.

FIG. 7 illustrates an example of a neural network-based classifier 708, which represents one possible implementation of the second machine learning model 108 in the system 100 shown in FIG. 1. The neural network-based classifier 708 (which may be referred to herein simply as a classifier 708) includes an input layer 726, an output layer 728, and a hidden layer 730 connecting the input layer 726 and the output layer 728.

The classifier 708 includes two input layer values 746a-b and one output layer value 748. The input layer values 746a-b correspond to the hidden layer values 336, 338 from the autoencoder 304. The output layer value 748 corresponds to a recommended characteristic for a cloud database. The classifier 708 also includes a plurality of hidden layer values 750a-n.

There may be a training phase for the classifier 708. The purpose of the training phase is to train the hidden layer 730 of the classifier 708 to map a particular compressed representation 312 from the autoencoder 304 to a particular characteristic of a cloud database. During the training phase, the classifier 708 may be executed many times. Each time the classifier 708 is executed, the input layer values 746a-b may be selected from hidden layer values 436a-i, 438a-i within sets 540a-n of compressed representations corresponding to databases 502a-n with known characteristics 544a-n.

For example, during a particular iteration of executing the classifier 708, the values 336, 338 within a particular compressed representation 312 may be used as the input layer values 746a-b to the classifier 708. A characteristic of the database 202 from which the compressed representation 312 was generated may be used as the output layer value 748. This type of training may be repeated many times for many hidden layer values 436a-i, 438a-i within sets 540a-n of compressed representations corresponding to databases 502a-n with known characteristics 544a-n. Once there have been enough iterations so that the classifier 708 has been adequately trained, then the classifier 708 may be used to provide recommendations for the migration of databases in the manner described above.

Figure 8:
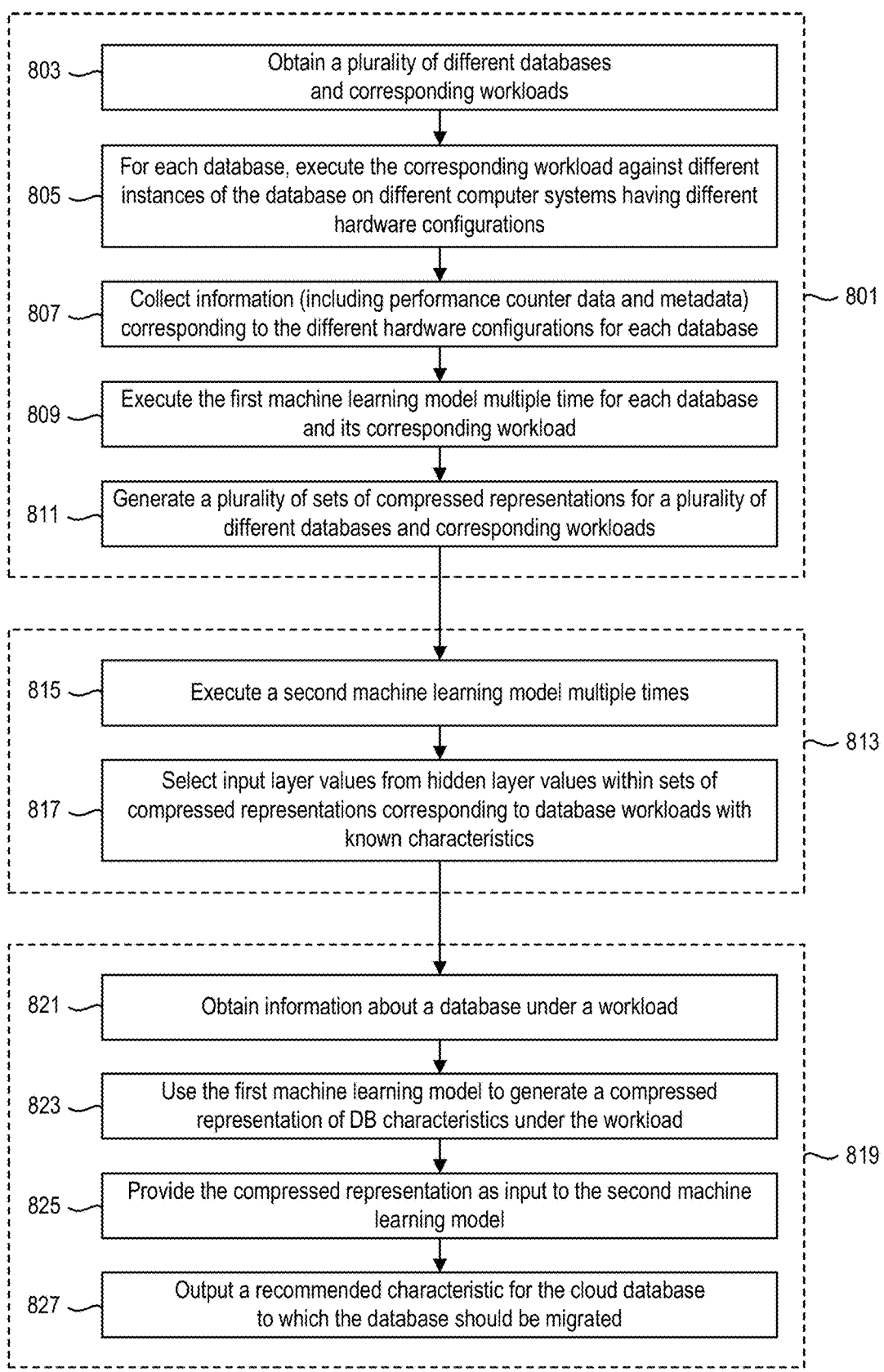
FIG. 8 illustrates a method for providing one or more recommendations for migration of a database to a cloud computing system in accordance with an embodiment of the present disclosure.

FIG. 8 illustrates a method 800 for providing one or more recommendations for migration of a database to a cloud computing system in accordance with an embodiment of the present disclosure. The method 800 includes three different phases: a similarity space creation phase 801, a training phase 813, and a deployment phase 819.

The similarity space creation phase 801 will be discussed initially. As discussed above, one objective of the similarity space creation phase 801 is to generate sufficient data to enable the second machine learning model 108 to be adequately trained. During the similarity space creation phase 801, a plurality of different databases 202 and corresponding workloads 218 are obtained 803. For each database 202, the corresponding workload 218 may be executed 805 against different instances 202a-c of the database 202 running on a plurality of different computer systems 220a-c having different hardware configurations. For each database 202, information 222a-c (including performance counter data and metadata) corresponding to the different hardware configurations may be collected 807.

A first machine learning model 104, such as an autoencoder 304, may be executed 809 multiple times for each database 202 and its corresponding workload 218. Different combinations of the subsets 224a-c of the information 222a-c that was collected for the database 202 may be used as the input layer values 332a-n and the output layer values 334a-n of the autoencoder 304. This has the effect of generating a plurality of compressed representations 412a-i for each of a plurality of different databases 502a-n and corresponding workloads 518a-n. In other words, a plurality of sets 540a-n of compressed representations may be generated 811 for a plurality of different databases 502a-n and associated workloads 518a-n.

These sets 540a-n of compressed representations may be used during the next phase, which is the training phase 813. As discussed above, one objective of the training phase is to train the second machine learning model 108 (e.g., the classifier 708) to map a particular compressed representation 112 that is generated by the first machine learning model 104 (e.g., the autoencoder 304) to a particular characteristic of a cloud database. During the training phase 813, the second machine learning model 108 may be executed 815 multiple times. Each time the second machine learning model 108 is executed, the input layer values 746a-b for the second machine learning model 108 may be selected 817 from hidden layer values 436a-i, 438a-i within sets 540a-n of compressed representations corresponding to databases 502a-n with known characteristics 544a-n.

Once the training phase 813 has completed and the second machine learning model 108 has been adequately trained, then the method 800 enters the deployment phase 819. During the deployment phase, the second machine learning model 108 may be used to provide recommendations for the migration of databases 102 to a cloud computing system. In order to provide one or more recommendations for the migration of a particular database 102 to a cloud computing system, information 106 (including performance counter data and metadata) may be obtained 821 about the database 102 under a workload 118. The first machine learning model 104 may be used to generate 823 a compressed representation 112 of characteristics of the database 102 under the workload 118.

The compressed representation 112 may then be used to determine at least one recommended characteristic for a cloud database to which the database 102 should be migrated. The second machine learning model 108 may be used to make this determination. More specifically, the compressed representation 112 may be provided 825 as input to the second machine learning model 108. As noted above, during the training phase 813 the second machine learning model 108 was trained to map a particular compressed representation 112 from the first machine learning model 104 to a particular characteristic of a cloud database. Thus, when the compressed representation 112 is provided as input to the second machine learning model 108 during the deployment phase 819, the second machine learning model 108 outputs 827 a recommended characteristic of the cloud database to which the database 102 should be migrated.

In the embodiment shown in FIG. 1, the compressed representation 112 corresponding to a particular database 102 is provided to a single instance of the second machine learning model 108. In an alternative embodiment, however, the compressed representation 112 may be provided to a plurality of different instances of the second machine learning model 108.

Figure 9:
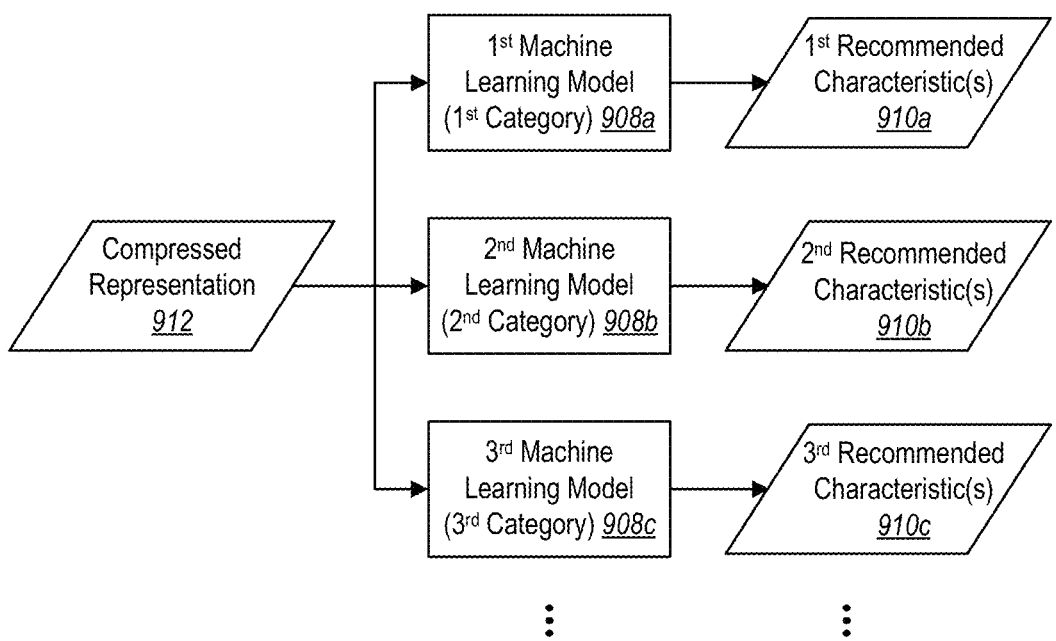
FIG. 9 illustrates a system in which a compressed representation is provided to a plurality of different instances of the second machine learning model.

FIG. 9 illustrates such an embodiment. In the system 900 shown in FIG. 9, there are a plurality of different instances of the second machine learning model 908a-c. Each instance corresponds to a different category of cloud databases. More specifically, a first instance of the second machine learning model 908a corresponds to a first category of cloud databases, a second instance of the second machine learning model 908b corresponds to a second category of cloud databases, a third instance of the second machine learning model 908c corresponds to a third category of cloud databases, and so forth.

The categories may indicate different characteristics of cloud databases, with some categories representing greater computational resources than others. For example, there may be a standard category corresponding to a basic level of computational resources, a premium category corresponding to an increased level of computational resources, and a business critical category corresponding to the highest available level of computational resources.

Different instances of the second machine learning model 908a-c may be developed for each of the available categories. More specifically, referring to the method 800 shown in FIG. 8, the operations that were described in connection with the similarity space creation phase 801 and the training phase 813 may be performed for each of the instances of the second machine learning model 908a-c. Thus, each of the instances of the second machine learning model 908a-c may be trained to map a particular compressed representation 912 that is generated by the first machine learning model 104 to a particular characteristic of a cloud database that corresponds to a particular category (e.g., basic, premium, business critical). Then, during the deployment phase 819, when a compressed representation 912 is generated corresponding to a particular database 102 that is being migrated to a cloud computing system, that compressed representation 912 may be provided to each of the instances of the second machine learning model 908a-c. This results in different recommendations being generated corresponding to the different categories of cloud databases that are available. FIG. 9 shows the first instance of the second machine learning model 908a outputting one or more recommended characteristics 910a corresponding to the first category of cloud databases, the second instance of the second machine learning model 908b outputting one or more recommended characteristics 910b corresponding to the second category of cloud databases, the third instance of the second machine learning model 908c outputting one or more recommended characteristics 910c corresponding to the third category of cloud databases, and so forth.

As discussed above in connection with FIG. 2, it may not be desirable to use all of the information 222a-c that is collected when a workload 218 is executed against different instances 202a-c of a database 202 running on different computer systems 220a-c having different hardware configurations. Subsets 224a-c of the information 222a-c may be used instead.

Figure 10:
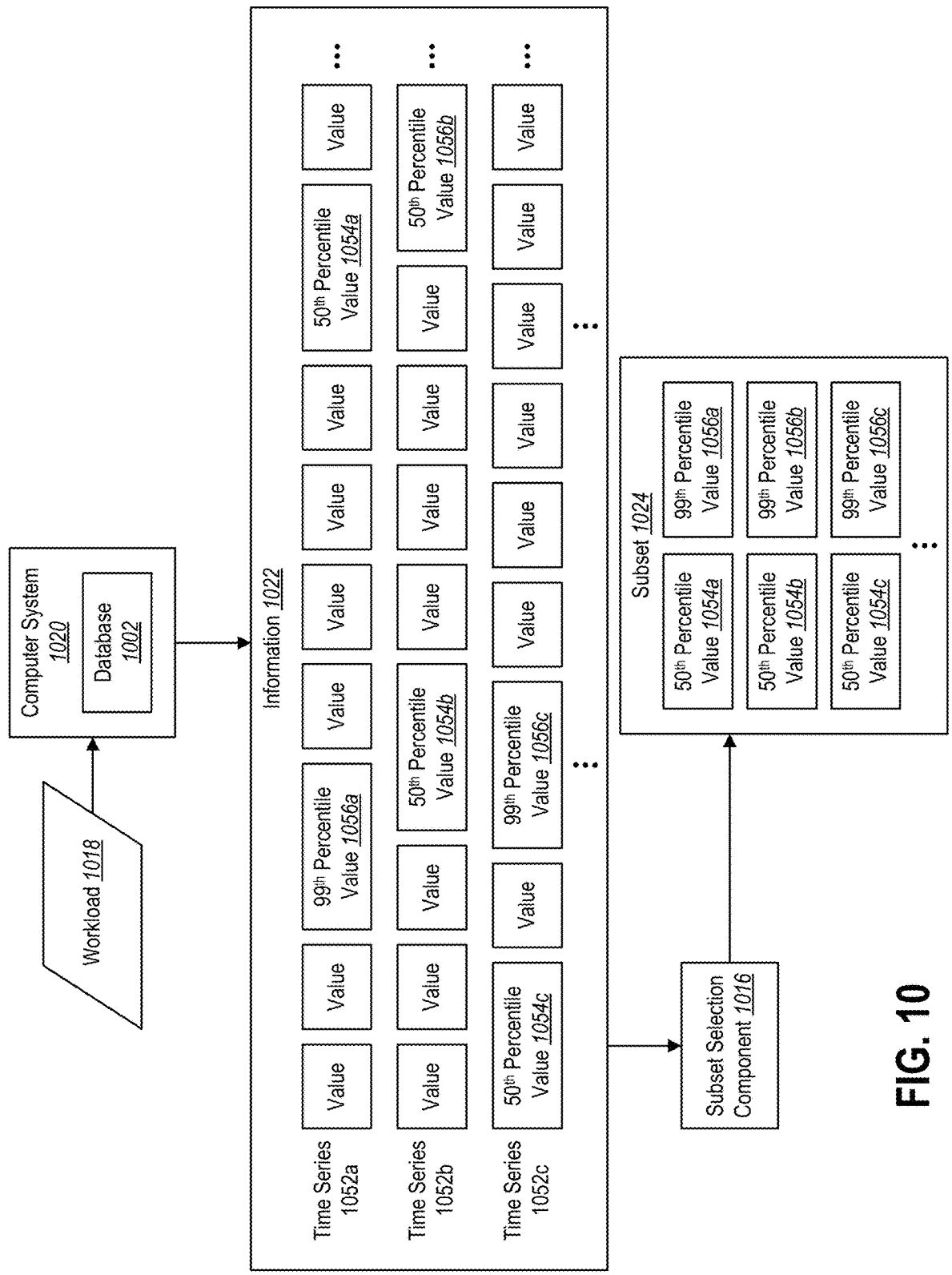
FIG. 10 illustrates an example showing how a subset of information about the performance of a database operating under a workload may be selected.

FIG. 10 illustrates an example showing how a subset 1024 of the collected information 1022 may be selected. The information 1022 is generated by executing a workload 1018 against a database 1002 running on a particular computer system 1020 having a particular hardware configuration. The information 1022 includes time series data corresponding to a plurality of performance counters. More specifically, the information 1022 includes a time series 1052a of values corresponding to a first performance counter, a time series 1052b of values corresponding to a second performance counter, a time series 1052c of values corresponding to a second performance counter, etc.

FIG. 10 shows a subset selection component 1016, which is configured to select a subset 1024 of the information 1022 for use in connection with the first machine learning model 104 (and subsequent phases of the techniques disclosed herein). In the depicted embodiment, selecting a subset 1024 of the information 1022 involves identifying two values for each performance counter: the 50th percentile value, and the 99th percentile value. Thus, the subset 1024 of the information 1022 includes two values (i.e., the 50th percentile value 1054a and the 99th percentile value 1056a) from the time series 1052a corresponding to the first performance counter, two values (i.e., the 50th percentile value 1054b and the 99th percentile value 1056b) from the time series 1052b corresponding to the second performance counter, two values (i.e., the 50th percentile value 1054c and the 99th percentile value 1056c) from the time series 1052c corresponding to the third performance counter, and so forth.

Of course, the number of values that are identified in FIG. 10, as well as the specific percentiles that are identified, are examples only. Different numbers of values and different percentiles may be identified in different implementations of the techniques disclosed herein.

As used herein, the term "percentile value" refers to a statistical value that indicates the relative placement of a value (in terms of its magnitude) within a series of values (e.g., a time series of values). Thus, if there were 100 values within a particular time series, there would be 49 values that are smaller than the 50th percentile value and 50 values that are greater than the 50th percentile value. There would be 98 values that are smaller than the 99th percentile value and one value that is greater than the 99th percentile value. As shown in FIG. 10, the 50th and 99th percentile values may be located in different places in different time series. Also, the 50th and 99th percentile values may occur in a different order in different time series. In other words, the 50th percentile value may occur before the 99th percentile value in some time series but after the 99th percentile value in other time series.

When the second machine learning model 108 has been sufficiently trained and the second machine learning model 108 is being used to provide a recommendation for migration of a particular database 102, a technique similar to the one shown in FIG. 10 may be used for selecting a subset 114 of the information 106 that is obtained for the database 102. In other words, a defined number of percentile values (e.g., the 50th percentile value and the 99th percentile value) may be identified for the time series that are included in the information 106 that is obtained for the database 102.

In some embodiments, selecting a subset 1024 of the available information 1022 may additionally involve selecting a subset of the available performance counter data that has been identified as useful via feature reduction. For example, if there are N available performance counters, M performance counters may be selected, where M<N. In some implementations, there may be a large number of performance counters (e.g., more than 800 counters), and only a relatively small number of performance counters (e.g., 40) may be selected.

As discussed previously, one aspect of the present disclosure is related to obtaining a sufficient amount of data to facilitate the creation of a similarity space. As discussed above, this involves obtaining information 222a-c corresponding to a plurality of different databases 502a-n that have known characteristics 544a-n and that are operating under corresponding workloads 518a-n.

Figure 11:
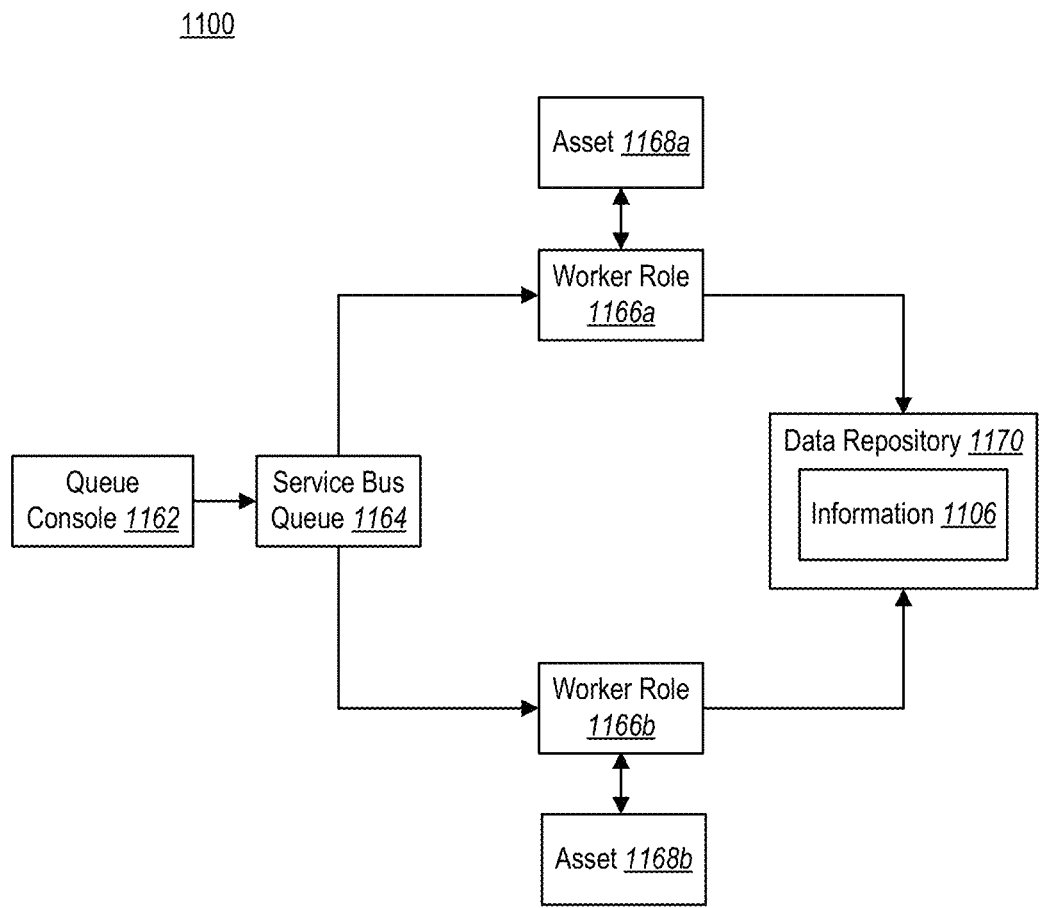
FIG. 11 illustrates an example of an environment for collecting information about the performance of databases operating under workloads.

FIG. 11 illustrates an example of an environment for collecting this information 1106. The environment may be referred to as a data lab 1100. The data lab 1100 may be a cloud-based system. In general, the data lab 1100 automates the process of collecting data and executing workloads 518a-n against databases 502a-n.

The data lab 1100 includes a plurality of worker roles 1166a-b. The worker roles 1166a-b may be configured to provision/restore databases, execute workloads against databases, and collect information 1106. The worker roles 1166a-b may collect information 1106 that is generated from executing workloads against databases being run on different hardware configurations, as discussed above. The information 1106 may be stored in a data repository 1170. In FIG. 11, the worker roles 1166a-b are shown interacting with assets 1168a-b, which may include computer systems running one or more databases.

The worker roles 1166a-b may be cloud-based systems that listen for messages coming from a cloud-based queueing system, which is shown in FIG. 11 as a service bus queue 1164. Messages may be pushed from a queue console 1162 to the service bus queue 1164 and then to the worker roles 1166a-b.

In some implementations, the data lab 1100 may have advanced capabilities, such as allowing the user to control the rate at which a workload is replayed and the number of workloads that can be concurrently replayed on the same machine. All of the information 1106 from a particular workload (including performance counter data and data from other events) may be collected by the data lab 1100 and stored in a data repository 1170.

Another aspect of the present disclosure is related to the ability to generate synthetic workloads on-the-fly to increase the amount of data available for modeling. In this context, the term "synthetic" refers to an automatically generated database with realistic queries. User databases are generally backed by an application, and are expensive and difficult to integrate into experimental harnesses such as the data lab 1100 shown in FIG. 11. Synthetic databases, on the other hand, are able to be spun up on-the-fly, and are inexpensive to create. This makes it easier to enlarge the data set that is used to train the second machine learning model 108.

A framework for recommending the proper cloud database size as described herein may be implemented as a software tool. The software tool may be implemented for use in a variety of different environments. For example, the software tool may be implemented as a desktop application, a cloud-based software tool, or the like. The workflow for using the tool may be relatively simple for the end user. The end user may simply run a script on a machine that has access to the database(s) to be analyzed (and potentially migrated). The script does not necessarily have to run on the exact same machine; remote access is possible. The script may collect information about the database(s) to be analyzed. The script may generate a file containing the information. The user may load this file into the tool, which may then parse the file and run the models. Very little time may be required in order to make a recommendation. In some implementations, the overall time to predict is on the order of seconds. Once the user has viewed the recommendation(s), the user can provision the database and migrate.

Figure 12:
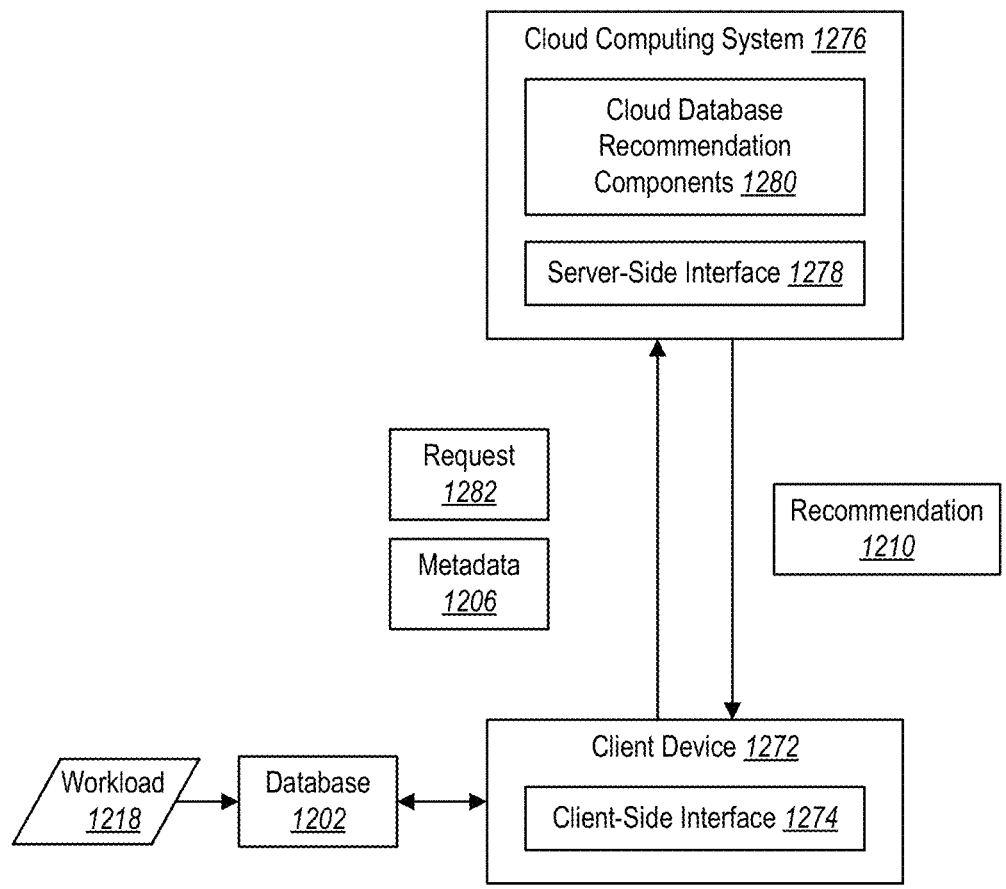
FIG. 12 illustrates an example of a system that includes a cloud-based software tool configured to implement the techniques disclosed herein.

FIG. 12 illustrates an example of a system 1200 where the software tool is implemented as a cloud-based software tool. The system 1200 shown in FIG. 12 includes a client device 1272. The client device 1272 may be any type of computing device, such as a desktop computer, laptop computer, tablet computer, smartphone, etc. The client device 1272 includes an interface 1274 for communicating with a cloud computing system 1276. This interface 1274 may be referred to herein as a client-side interface 1274. The client-side interface 1274 may communicate with an interface 1278 on the cloud computing system 1276. This interface 1278 may be referred to herein as a server-side interface 1278. Communication between the client-side interface 1274 on the client device 1272 and the server-side interface 1278 on the cloud computing system 1276 may occur via the Internet. In some embodiments, the client-side interface 1274 may take the form of a web browser, and the server-side interface 1278 may include one or more web servers.

The cloud computing system 1276 includes cloud database recommendation components 1280 that implement some or all of the techniques disclosed herein. If a user of the client device 1272 wants to convert a database 1202 to a cloud database that runs on the cloud computing system 1276, the user of the client device 1272 may request one or more recommendations from the cloud database recommendation components 1280. For example, the client device 1272 may send a request 1282 to the cloud database recommendation components 1280 (via the interfaces 1274, 1278) for a recommendation regarding a characteristic of the cloud database to which the database 1202 should be migrated. The client device 1272 may also provide information 1206 corresponding to the database 1202 to be analyzed by the cloud database recommendation components 1280.

The cloud database recommendation components 1280 may use the techniques disclosed herein to generate and provide the requested recommendation 1210. For example, a first machine learning model 104 may be used to generate a compressed representation 112 of characteristics of the database 1202 under a workload 1218. A second machine learning model 108 may map a particular compressed representation 112 that is generated by the first machine learning model 104 to a particular characteristic of a cloud database. This characteristic may be sent back to the client device 1272 in the form of a recommendation 1210.

In some embodiments, the recommendation 1210 may take the form of one or more metrics. One metric that may be computed is the minimum database size, which may be developed by examining the minimum database size for which each workload 1218 completes with less than some threshold level (e.g., less than 10%) of queries timing out.

As discussed above, the information that is used to create the similarity space and train the second machine learning model 108 may come from a plurality of different workloads 518*a-n*. These workloads 518*a-n* may include user workloads (e.g., customer workloads) as well. For example, when information 1206 is submitted (or otherwise obtained) from a user as part of a request 1282 to obtain a recommendation 1210, that information 1206 may be used to help further enhance the similarity space. If the user's database 1202 is ultimately migrated to the cloud computing system 1276 (so that the actual characteristics of the corresponding cloud database may be determined), then the information 1206 may be used to help train the second machine learning model 108 as well. Information from workloads run on a variety of systems (including on-premise databases and cloud databases) may be utilized to create and enhance the similarity space and to further train the second machine learning model 108.

Another aspect of the present disclosure is the ability to learn from anonymized user data to continuously improve the quality of the recommendations that are provided. As noted above, a framework for recommending the proper cloud database size as described herein may be implemented as a cloud-based software tool. As the tool is used, performance counter data may be collected from users' databases and saved to the cloud. If a database is provisioned after predicting data, that data can be linked to the performance counter data to provide labeled data to further improve modeling. These links may be made anonymously, in order to maintain user privacy. This data collection may make it possible to leverage past customer experiences to continuously improve the model to make better recommendations. In other words, as customers use the tool, their data can be collected anonymously and used to improve the quality of the recommendations produced by the model.

A framework for recommending the proper cloud database size as described herein may be capable of greater granularity than is possible with known approaches. For example, the techniques disclosed herein may be able to make a recommendation using database-level counters. This can be helpful in the context of planning large-scale migrations. Enterprises generally host multiple databases on a single server instance. This means that with previous approaches, it would be possible to get a prediction for the aggregate (i.e., sum) of all of the different workloads. Such a prediction is not particularly useful for someone who is trying to determine the proper sizing for a single database on a server hosting a larger number (e.g., 1000) databases. By using database-specific counters, the techniques disclosed herein are able to provide a useful recommendation in this scenario. In other words, in accordance with the techniques disclosed herein, it is possible to provide a recommendation for a single database on a server hosting a large number of databases.

Another technical benefit of the present disclosure is related to providing a recommendation in a relatively short period of time. In some implementations, it may be possible to provide a recommendation after collecting information for less than an hour. However, the accuracy typically improves with longer collection times.

When attempting to use machine learning to solve problems, one should be very careful to prevent the model from overfitting. Overfitting happens when the model memorizes the labels of a specific data set rather than learning the general relationship. This is a problem with all machine learning models, and is especially difficult to overcome when data sets are small and/or lack variety. To verify that a model in accordance with the present disclosure is not overfitting, the model may be verified using a form of cross validation that may be referred to as "Leave One Database Out" validation. In this procedure, all of the data points for a single database may be removed from the training set. After training the model on the reduced set, the model may be tested on the held out data points. This procedure may be repeated for every database in the set, and the metrics may be aggregated. This procedure may be used to verify that a model as described herein may be able to generalize to unseen workloads, and that the high performance of the model is not solely due to overfitting. This procedure may also make it possible to quantify the effects of model changes that balance performance and robustness.

In some embodiments, the size of a database may be expressed in terms of a stock keeping unit (SKU) and a service level objective (SLO). A SKU is a more granular description of a database size than a SLO. Similar SKUs may be grouped together into the same SLO. A recommendation about the size of a cloud database may indicate a particular SKU as well as a particular SLO.

Figure 13:
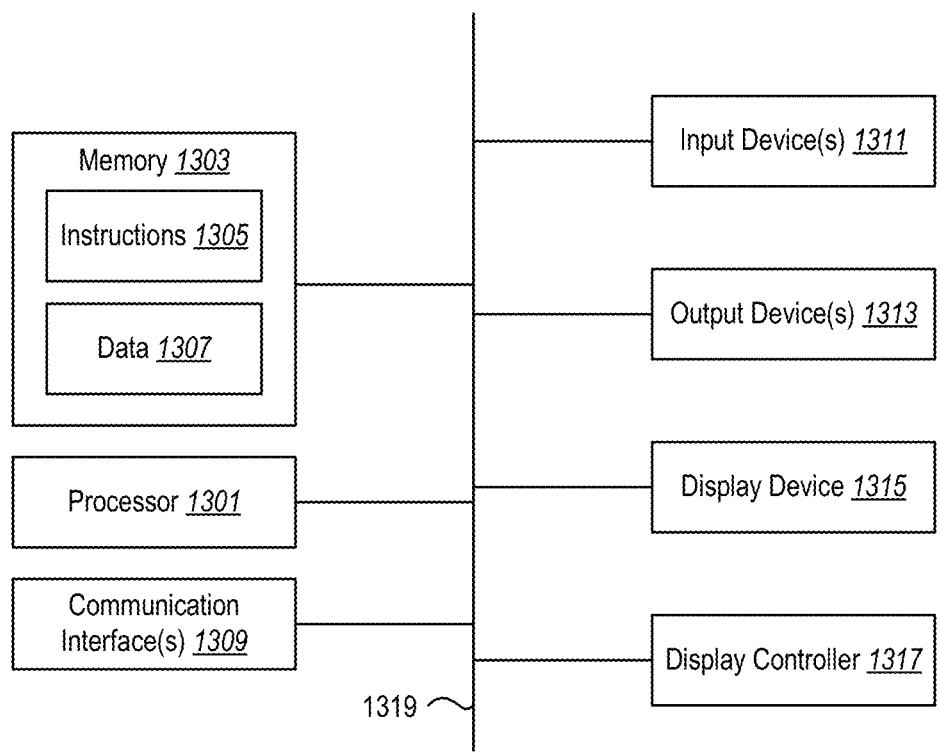
FIG. 13 illustrates certain components that may be included within a computer system.

FIG. 13 illustrates certain components that may be included within a computer system 1300. One or more computer systems 1300 may be used to implement the various devices, components, and systems described herein.

The computer system 1300 includes a processor 1301. The processor 1301 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1301 may be referred to as a central processing unit (CPU). Although just a single processor 1301 is shown in the computer system 1300 of FIG. 13, in an alternative configuration, a combination of processors (e.g., an ARM and DSP) could be used.

The computer system 1300 also includes memory 1303 in electronic communication with the processor 1301. The memory 1303 may be any electronic component capable of storing electronic information. For example, the memory 1303 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 1305 and data 1307 may be stored in the memory 1303. The instructions 1305 may be executable by the processor 1301 to implement some or all of the steps, operations, actions, or other functionality disclosed herein. Executing the instructions 1305 may involve the use of the data 1307 that is stored in the memory 1303. Any of the various examples of modules and components described herein may be implemented, partially or wholly, as instructions 1305 stored in memory 1303 and executed by the processor 1301. Any of the various examples of data described herein may be among the data 1307 that is stored in memory 1303 and used during execution of the instructions 1305 by the processor 1301.

A computer system 1300 may also include one or more communication interfaces 1309 for communicating with other electronic devices. The communication interface(s) 1309 may be based on wired communication technology, wireless communication technology, or both. Some examples of communication interfaces 1309 include a Universal Serial Bus (USB), an Ethernet adapter, a wireless adapter that operates in accordance with an Institute of Electrical and Electronics Engineers (IEEE) 1302.11 wireless communication protocol, a Bluetooth® wireless communication adapter, and an infrared (IR) communication port.

A computer system 1300 may also include one or more input devices 1311 and one or more output devices 1313. Some examples of input devices 1311 include a keyboard, mouse, microphone, remote control device, button, joystick, trackball, touchpad, and lightpen. Some examples of output devices 1313 include a speaker and a printer. One specific type of output device that is typically included in a computer system 1300 is a display device 1315. Display devices 1315 used with embodiments disclosed herein may utilize any suitable image projection technology, such as liquid crystal display (LCD), light-emitting diode (LED), gas plasma, electroluminescence, or the like. A display controller 1317 may also be provided, for converting data 1307 stored in the memory 1303 into text, graphics, and/or moving images (as appropriate) shown on the display device 1315.

The various components of the computer system 1300 may be coupled together by one or more buses, which may include a power bus, a control signal bus, a status signal bus, a data bus, etc. For the sake of clarity, the various buses are illustrated in FIG. 13 as a bus system 1319.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for providing one or more recommendations for migration of a database to a cloud computing system, comprising:
executing a plurality of different workloads against a plurality of different databases, wherein executing the plurality of different workloads against the plurality of different databases comprises:
executing a first workload against a first plurality of different instances of a first database running on different computer systems having different hardware configurations to generate first sets of information corresponding to the first database; and
executing a second workload against a second plurality of different instances of a second database running on the different computer systems having the different hardware configurations to generate second sets of performance counter data and metadata corresponding to the second database;
generating a plurality of different compressed representations of characteristics of the plurality of different databases operating under the plurality of different workloads using a first machine learning model, wherein generating the plurality of different compressed representations comprises:
repeatedly executing an autoencoder using different combinations of the first sets of information corresponding to the first database as input layer values and output layer values of the autoencoder; and
repeatedly executing the autoencoder using a second plurality of combinations of the second sets of information corresponding to the second database as the input layer values and the output layer values of the autoencoder;
determining at least one recommended characteristic for a cloud database using the plurality of different compressed representations and a second machine learning model; and
outputting the at least one recommended characteristic.

2. The method of claim 1, wherein:
the first machine learning model comprises a neural network-based autoencoder; and
the second machine learning model comprises a neural network-based classifier.

3. The method of claim 1, wherein:
the method further comprises training the second machine learning model to map a particular compressed representation that is generated by the first machine learning model to a particular characteristic of a cloud database; and
training the second machine learning model comprises using compressed representations from the first machine learning model as inputs to the second machine learning model, the compressed representations corresponding to databases with one or more known characteristics.

4. The method of claim 1, further comprising:
determining a plurality of recommended characteristics corresponding to different categories of cloud databases using the compressed representation and a plurality of instances of the second machine learning model; and
outputting the plurality of recommended characteristics.

5. The method of claim 1, wherein:
the compressed representation is generated for a subset of the information; and
the method further comprises selecting the subset by identifying a defined number of percentile values for time series data that is included in the information.

6. The method of claim 1, further comprising generating synthetic workloads to increase an amount of data available for training.

7. A system for providing one or more recommendations for migration of a database to a cloud computing system, comprising:
one or more processors; and
memory comprising instructions that are executable by the one or more processors to perform operations comprising:
executing a plurality of different workloads against a plurality of different databases, wherein executing the plurality of different workloads against the plurality of different databases comprises:
executing a first workload against a first plurality of different instances of a first database running on different computer systems having different hardware configurations to generate first sets of information corresponding to the first database; and
executing a second workload against a second plurality of different instances of a second database running on the different computer systems having the different hardware configurations to generate second sets of performance counter data and metadata corresponding to the second database;
generating a plurality of different compressed representations of characteristics of the plurality of different databases operating under the plurality of different workloads using a first machine learning model, wherein generating the plurality of different compressed representations comprises:
repeatedly executing an autoencoder using different combinations of the first sets of information corresponding to the first database as input layer values and output layer values of the autoencoder; and
repeatedly executing the autoencoder using a second plurality of combinations of the second sets of information corresponding to the second database as the input layer values and the output layer values of the autoencoder;
determining at least one recommended characteristic for a cloud database using the plurality of different compressed representations and a second machine learning model; and
outputting the at least one recommended characteristic.

8. The system of claim 7, wherein:
the first machine learning model comprises a neural network-based autoencoder; and
the second machine learning model comprises a neural network-based classifier.

9. The system of claim 7, wherein:
the operations further comprise training the second machine learning model to map a particular compressed representation that is generated by the first machine learning model to a particular characteristic of a cloud database; and
training the second machine learning model comprises using compressed representations from the first machine learning model as inputs to the second machine learning model, the compressed representations corresponding to databases with one or more known characteristics.

10. The system of claim 7, wherein the operations further comprise:
determining a plurality of recommended characteristics corresponding to different categories of cloud databases using the compressed representation and a plurality of instances of the second machine learning model; and
outputting the plurality of recommended characteristics.

11. The system of claim 7, wherein:
the compressed representation is generated for a subset of the information; and
the operations further comprise selecting the subset by identifying a defined number of percentile values for time series data that is included in the information.

12. The system of claim 7, wherein the operations further comprise generating synthetic workloads to increase an amount of data available for training.

13. A non-transitory computer-readable medium having computer-executable instructions stored thereon that, when executed, cause one or more processors to perform operations comprising:
executing a plurality of different workloads against a plurality of different databases, wherein executing the plurality of different workloads against the plurality of different databases comprises:
executing a first workload against a first plurality of different instances of a first database running on different computer systems having different hardware configurations to generate first sets of information corresponding to the first database; and
executing a second workload against a second plurality of different instances of a second database running on the different computer systems having the different hardware configurations to generate second sets of performance counter data and metadata corresponding to the second database;
generating, based at least on a subset of the information, a plurality of different compressed representations of characteristics of the plurality of different databases operating under the plurality of different workloads using a first machine learning model, wherein generating the plurality of different compressed representations comprises:
repeatedly executing an autoencoder using different combinations of the first sets of information corresponding to the first database as input layer values and output layer values of the autoencoder; and repeatedly executing the autoencoder using a second plurality of combinations of the second sets of information corresponding to the second database as the input layer values and the output layer values of the autoencoder;

determining at least one recommended characteristic for a cloud database using the plurality of different compressed representations and a second machine learning model; and outputting the at least one recommended characteristic.

14. The computer-readable medium of claim 13, wherein:

the operations further comprise training the second machine learning model to map a particular compressed representation that is generated by the first machine learning model to a particular characteristic of a cloud database; and training the second machine learning model comprises using compressed representations from the first machine learning model as inputs to the second machine learning model, the compressed representations corresponding to databases with one or more known characteristics.

* * * * *